(12) United States Patent
Gammieri

(10) Patent No.: US 6,711,848 B1
(45) Date of Patent: Mar. 30, 2004

(54) FISHING LURE HAVING A RETRACTABLE HOOK

(76) Inventor: Luigi Gammieri, 9265 Iberville, Montreal, QC (CA), H1Z 2R5

( * ) Notice: Subject to any disclaimer, the term of this patent is extended or adjusted under 35 U.S.C. 154(b) by 0 days.

(21) Appl. No.: 09/606,123

(22) Filed: Jun. 28, 2000

(30) Foreign Application Priority Data

Apr. 27, 2000 (CA) .............................................. 2306.041

(51) Int. Cl.⁷ .............................................. A01K 83/02
(52) U.S. Cl. .................................. 43/35; 43/37; 43/36
(58) Field of Search ................................ 43/34, 35, 36, 43/37

(56) References Cited

U.S. PATENT DOCUMENTS

| | | | | | |
|---|---|---|---|---|---|
| 1,812,906 A | * | 7/1931 | Swearingen | ................... | 43/37 |
| 2,229,259 A | * | 1/1941 | Sherwood | ...................... | 43/37 |
| 2,256,088 A | * | 9/1941 | Hogan | ............................ | 43/37 |
| 2,474,481 A | * | 6/1949 | Kleppen | ........................ | 43/37 |
| 2,491,546 A | * | 12/1949 | Barnett | ........................... | 43/36 |
| 2,597,832 A | * | 5/1952 | Wolf | ............................... | 43/37 |
| 2,643,479 A | * | 6/1953 | Stevenson | ....................... | 43/36 |
| 2,747,412 A | * | 5/1956 | Hanks | ............................. | 43/34 |
| 2,752,719 A | * | 7/1956 | Walters | ........................... | 43/36 |
| 2,833,076 A | * | 5/1958 | Carradi | ............................ | 43/36 |
| 3,266,185 A | * | 8/1966 | Abramson, Jr. | ................. | 43/37 |
| 3,410,019 A | * | 11/1968 | Landi | ............................. | 43/37 |
| 3,411,233 A | * | 11/1968 | Hopper | .......................... | 43/37 |
| 3,497,985 A | * | 3/1970 | Margulies | ....................... | 43/37 |
| 3,739,517 A | * | 6/1973 | Schleif | ........................... | 43/35 |

* cited by examiner

Primary Examiner—Kurt Rowan

(57) ABSTRACT

A fishing lure for allowing selective deployment of a fish hook. The fish hook is pivotally mounted to the body of the lure. The hook is allowed to pivot between a retracted configuration wherein it is substantially housed within a hook recess formed in the body and an extended configuration wherein the hook bight end extends out of the body. An actuating mechanism located within the body allows the hook to be deployed upon tension being applied to the fishing line. A biasing mechanism also located within the lure body biases the hook towards its retracted configuration. An adjustment mechanism allows for adjustment of the strength of the biasing force. The adjustment mechanism thus allows the biasing force to be customized depending on fishing parameters.

19 Claims, 6 Drawing Sheets

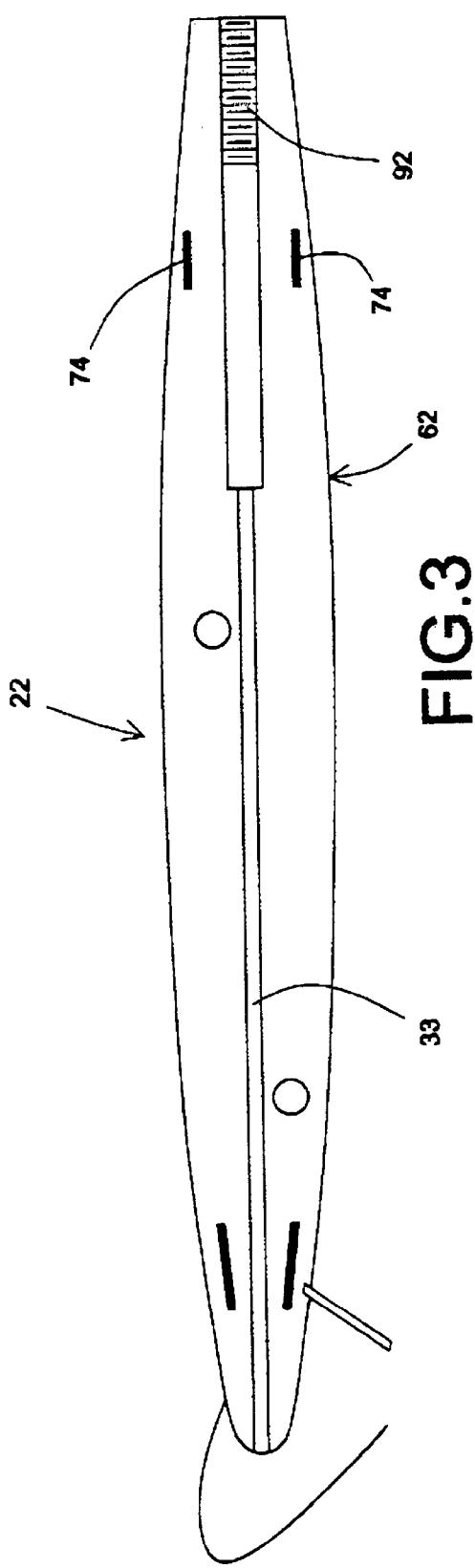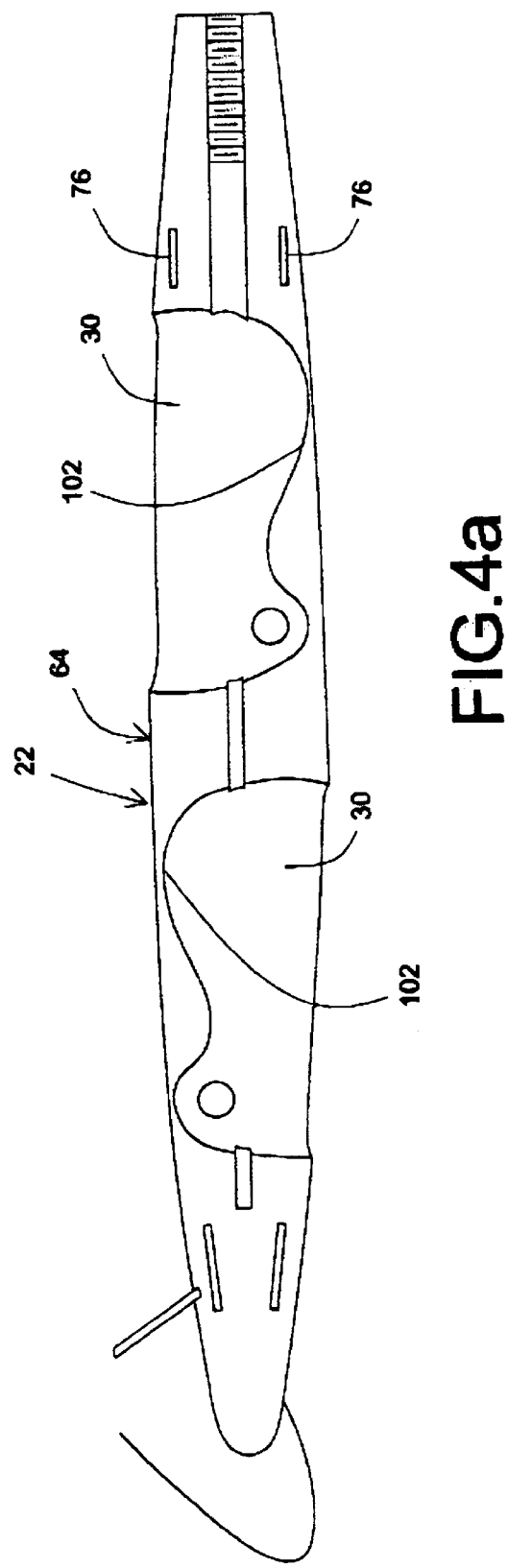

FISHING LURE HAVING A RETRACTABLE HOOK

FIELD OF THE INVENTION

The present invention relates to the general field of fishing accessories and is particularly concerned with a fishing lure having a retractable hook.

BACKGROUND OF THE INVENTION

Artificial fishing lures are used extensively by many fishing enthusiasts. Such artificial fishing lures are designed to simulate the natural food source of the fish.

There exists a variety of artificial fishing lure types. One common type of fishing lure is the so-called "hard body" fishing lure. Such "hard body" fishing lure is typically made out of a solid piece of material shaped so as to simulate the appearance of a natural life baitfish such as a minnow or the like.

A common problem that has plagued the use of prior art fishing lures in the past has been that when retrieving or reeling in the lure, the latter oftentimes becomes entangled or encumbered with vegetation, debris or the like. Indeed although underwater brush and weeds form an attractive habitat for many varieties of the fish, the same underwater flora all too often presents an unavoidable snag or trap for fishing lures or jig.

Hence, fishing hooks responsible for snagging the fish are susceptible themselves of being snagged on underwater flora, debris or other obstacles. The problem is compounded when multiple hooks extend from a lure. For example, a so-called treble hook often provides three times the number of snagging barbs than a single barb hook.

As a result of lures being caught or snagged in underwater flora or other obstacles a considerable amount of fishing time is wasted. At best, the lures can be retrieved from weeds or the like through a tedious procedure. Often times, they are deemed unretrievable and must be replaced, hence, incurring additional costs.

Another problem associated with conventional fishing lures, especially lures using treble hooks, is that since the barbed end of the hooks is permanently exposed, the fishermen or other individuals in the vicinity may be injured during handling of the lure. The problem is compounded when the lures are stored in a tackle box and need to be retrieved from a tackle box storing multiple lures.

Problems associated with conventional fixed hook fishing lures have been recognized in the past. Various types of so-called "weedless" fishing lures have been developed. One particular type, exemplified by U.S. Pat. No. 2,258,088 naming E. F. Hogan as the inventor and issued Sep. 16, 1941, uses retractable hooks attached to a lure body. The hooks are mounted so as to be snapped open when a fish bites the lure.

Although somewhat useful, the prior art fishing lures having retractable hooks nevertheless suffer from numerous drawbacks. In general, some of the drawbacks encountered with prior art retractable hook fishing lures include the use of complex mechanisms that lead to increased manufacturing costs and decreased reliability. Other drawbacks include unfavorable orientation of the hooks or barbs for hooking and retrieving fish, the tendency for hooks to return to the retracted weedless position after initially opening in response to a fishing bight and so forth.

One of the main drawbacks associated with prior art retractable hook fishing lures is their lack of versatility or inability to adjust to various fishing conditions and parameters. Indeed, the trigger and biasing components associated with prior art retractable hook fishing lures are typically set to a predetermined threshold. Hence, the fishing line tension at which the hooks will extend to their operational configuration is permanently set to a predetermined value. Furthermore, the strength of the biasing force that biases the hooks towards their retracted configuration is set to a predetermined value.

In prior art devices, the biasing mechanism biasing the hooks towards their retracted configuration exerts a weak biasing force, the hooks may be falsely triggered to their operational fishing configuration for example during surface trolling or in bottom trolling in a densely vegetated area. Conversely, if the biasing mechanism exerts a strong biasing force the hooks will tend to return to their retracted configuration after initially opening in response to a fish bight or may even be unable to be moved to their operational fishing configuration.

Accordingly, in view of the ever present need for a weedless lure, and in view of the significant limitations off the prior art lures, there still exist need for an improved fishing lure having a retractable hook.

SUMMARY OF THE INVENTION

It is therefore an object of the present invention to provide an improved fishing lure.

Advantages of the present invention include that the proposed fishing lure is provided with at least one retractable hook positionable between an operational fishing configuration wherein it can be used to catch fish and a retracted configuration wherein it reduces the risks of being snagged in underwater vegetation or debris.

Also, the proposed fishing lure is designed so as to facilitate replacement of its fishing hook should the latter become damaged or need replacement for other reasons.

Furthermore, the proposed fishing lure is provided with an adjustable biasing mechanism for biasing the hook towards its retracted configuration thus enabling the biasing force to be customized for various fishing conditions and parameters. The adjustment of the strength biasing force exerted on the hook can be performed easily and readily through a set of ergonomical steps without requiring special tooling or manual dexterity.

Still further, the proposed lure is provided with an actuating and a biasing mechanism for selectively moving the hook between its extended and retracted configuration. The proposed actuating and biasing mechanisms are specifically designed so as to be mechanically simple, hence, providing relatively inexpensive and a reliable structure. Still furthermore, the proposed lure allows for deployment of the fishing hook from various positions relative to the lure outer surface. Also, the proposed fishing lure is designed so as to be manufacturable using conventional forms of manufacturing so as to provide a fishing lure that will be economically feasible, long-lasting and relatively trouble-free in operation.

In accordance with an embodiment of the present invention, there is provided a fishing lure for attachment to a fishing line, the fishing lure allowing selective deployment of a hook, the hook defining a hook attachment end, a hook bight end and a hook shank extending therebetween; the fishing lure comprising: a body, the body being provided with a hook recess projecting thereinto for receiving the hook; a hook pivotal attachment means attached to the body for pivotally attaching the hook to the body so as to allow the hook to pivot between a retracted configuration wherein the hook bight end is substantially housed within the hook recess and an extended configuration wherein the hook bight end is substantially extended out of the hook recess; an actuating mechanism located at least partially within the body between the fishing line and the hook for pivoting the hook towards the extended configuration upon a tension being applied to the fishing line; a biasing means for generating a biasing force, the biasing force biasing the hook towards the retracted configuration; and an adjustment means for adjusting the strength of the biasing force.

Preferably, the actuating mechanism includes: an elongated actuating rod defining a rod first end, a rod second end and a rod longitudinal axis, the actuating rod being slidably inserted in a corresponding rod channel formed in the body for reciprocating movement thereinto between a rod first and a rod second position; a rod-to-hook linking means for linking the actuating rod to the hook and converting the linear reciprocating movement of the actuating rod into a pivoting movement of the hook such that linear movement of the actuating rod towards the rod first position is converted into a pivotal movement of the hook towards the extended configuration and linear movement of the actuating rod towards the rod second position is converted into pivotal movement of the hook towards the hook retracted configuration.

Conveniently, the hook shank has a generally L-shaped configuration defining a shank spacing leg and a generally perpendicular shank abutment leg; the rod-to-hook linking means including a rod eyelet extending from the actuating rod in a direction generally perpendicular to the rod longitudinal axis, the shank abutment leg being inserted in the rod eyelet.

Preferably, the hook attachment end is provided with a hook eyelet and wherein the hook pivotal attachment means includes a hook attachment pin attached to the body and extending through the hook eyelet. Conveniently, the rod eyelet is configured and sized for allowing slidable insertion of the hook eyelet is the rod eyelet. Preferably, the body is made of two half-body sections, the hook attachment pin being also used for securing the half-body sections together.

Conveniently, the biasing means includes a spring component attached to both the body and the actuating rod adjacent the rod second end. Preferably, the spring component is an helicoloidal-type spring defining a spring longitudinal axis, a spring first end and a spring second end, the spring longitudinal axis being in a substantially collinear relationship relative to the rod longitudinal axis.

Conveniently, the adjustment means includes a tensioning shafts in a substantially collinear relationship relative to the rod longitudinal axis, the tensioning shaft being slidably inserted in a corresponding shaft recess formed in the body, the tensioning shaft defining a shaft first end and a shaft second end, the shaft first end being attached to the spring second end and the shaft second end protruding outwardly from the body, the adjustment means also including a shaft positioning means for selectively axially positioning the tensioning shaft relative to the body.

In one embodiment of the invention, the shaft positioning means includes a shaft thread formed on the tensioning shaft and a recess thread formed in the shaft recess, the shaft thread and the recess thread cooperating for positioning the tensioning shaft relative to the body.

Preferably, the spring second end is attached to the tensioning shaft and the spring first end is attached to the actuating rod by a spring-to-rod attachment means, the spring-to-rod attachment means allowing transmission of axial forces between the spring component and the actuating rod without transmitting rotational torque about the rod longitudinal axis between the spring component and the actuating rod.

Conveniently, the spring-to-rod attachment means includes: a spring attachment section formed on the actuating rod adjacent the rod second end, the spring attachment section being configured and sized for slidable insertion of a segment of the spring component thereover; a retaining protrusion formed on the spring attachment section for abuttingly retaining a segment of the spring component over the spring attachment section. Preferably, the retaining protrusion has a generally spherical configuration.

Conveniently, the body is made of a first half-body section and a second half-body section, the first and second half-body sections respectively defining first and second half-body contacting surfaces; the first half-body contacting surface being provided with the rod channel and the shaft recess formed therein; the second half-body contacting surface being provided with the hook recess formed therein. Preferably, the first and second half-body contacting surfaces are provided with corresponding tongue-and-groove arrangements extending therefrom for facilitating assembly of the first and second half-body sections together.

In an alternative embodiment of the invention, the fishing lure further comprises a pulley mounted within the body and a cable attached between the actuating rod and the fishing line, the cable being redirected by the pulley so as to allow the fishing line to be redirected relative to the body.

Other objects and advantages of the present invention will become apparent from a careful reading of the detailed description provided herein, with appropriate reference to the accompanying drawings.

BRIEF DESCRIPTION OF THE DRAWINGS

Embodiments of the present invention will now be disclosed, by way of example, in reference to the following drawings in which:

FIGS. 3 and 4a, in elevational views, illustrate a first and a second body half section part of a fishing lure in accordance with an embodiment of the present invention, respectively;

FIG. 4b illustrates an alternative embodiment of the second body half section shown in FIG. 4a;

DETAILED DESCRIPTION OF THE PREFERRED EMBODIMENTS

With reference to the annexed drawings the preferred embodiments of the present invention will be herein described for indicative purpose and by no means as of limitation.

Figure 1:
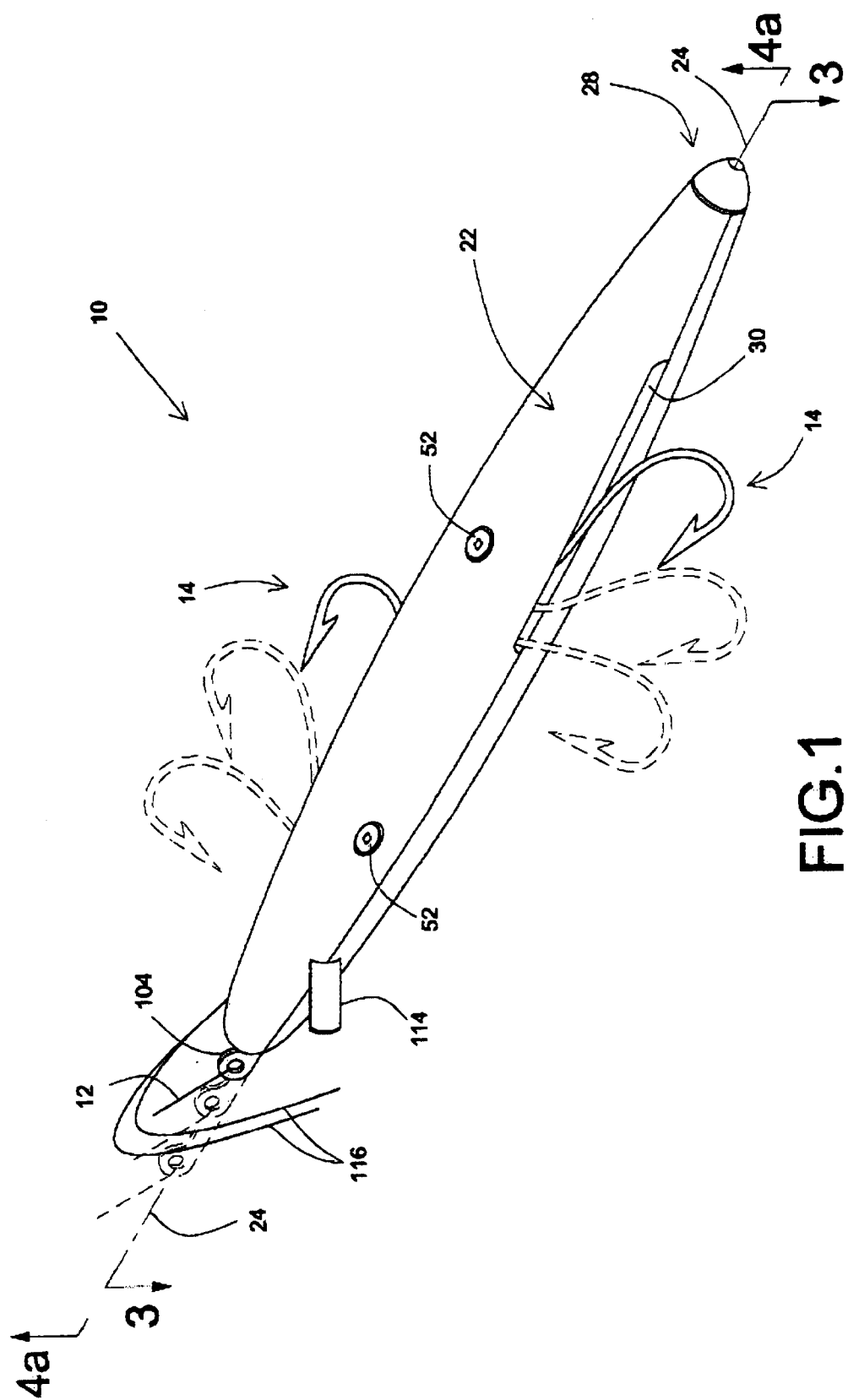
FIG. 1, in a perspective view, illustrates a fishing lure in accordance with an embodiment of the present invention, the fishing lure being shown with the hooks being deployed.

Referring to FIG. 1, there is shown a fishing lure 10 in accordance with an embodiment of the present invention. The fishing lure 10 is shown attached to a conventional fishing line 12 part a conventional fishing rod (not shown). The fishing lure 10 allows selective deployment of at least one fish hook 14. Alternatively, the fishing lure 10 can allow selective deployment of more than one fish hooks 14. In the embodiments shown throughout the figures, the fishing lure 10 is shown as allowing selective deployment of a pair of opposed fishing hooks 14. It should be understood that the fishing lure 10 could allow selective deployment of any number of fishing hooks 14 in any relationship relative to each other without departing from the scope of the present invention.

Figure 5:
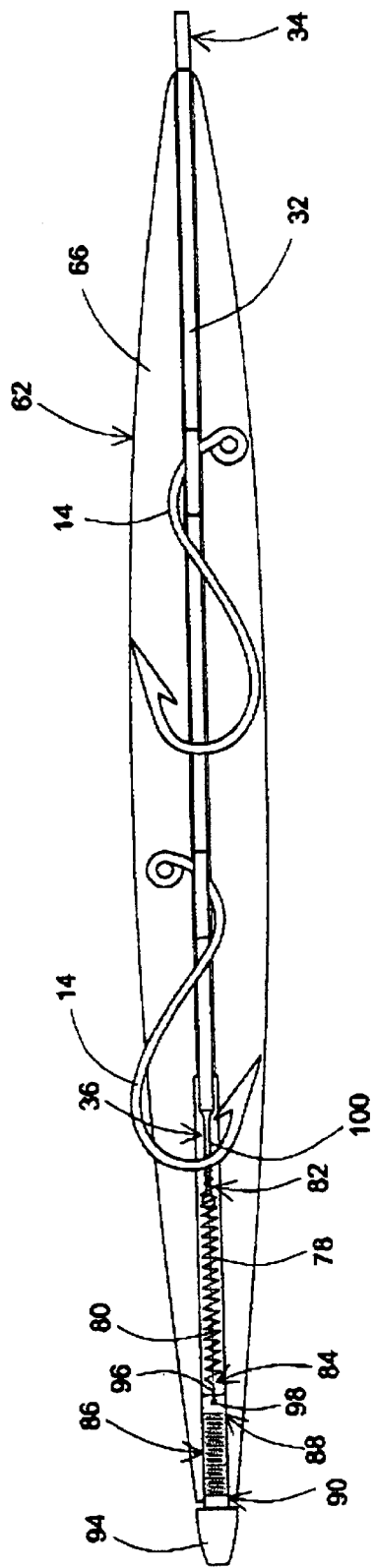
FIG. 5, in an elevational view, illustrates a first body half section having internal components mounted thereon.

As illustrated more specifically in FIG. 5, each fish hook 14 defines a hook attachment end 16, and opposed hook bight end 18 and a hook shank 20 extending therebetween. Again, it should be understood that although the hooks 14 shown throughout the figures are shown as having a specific common configuration, it should be understood that the hooks 14 could have other configurations without departing from the scope of the present invention.

The fishing lure 10 includes a body 22. The body 22 typically has the general external appearance of a baitfish such as a minnow or the like. The body 22 thus typically has a generally ellipsoidal configuration defining a body longitudinal axis 24, a body first longitudinal end 26 and a longitudinally opposed body the second longitudinal end 28.

The body 22 is provided with at least one hook recess 30 projecting thereinto. Each hook recess 30 is configured and sized for receiving a corresponding fish hook 14 thereinto. The body 22 is typically provided with a hook recess 30 for receiving each fishing hook 14. Alternatively, the body 22 could be provided with hook recesses 30 for only a limited number of fish hooks 14. In other words, some of the fish hooks 14 could be permanently deployed in their extended configuration.

The fishing lure 10 also includes a hook pivotal attachment means attached to the body 22. Each hook pivotal attachment means pivotally attaches a pivoting hook 14 to the body 22 so as to allow each pivoting hook 14 to pivot between a retracted configuration illustrated in FIG. 5 wherein the hook bight end 18 is at least substantially housed within a corresponding hook recess 30 and an extended configuration illustrated in FIG. 1 wherein the hook bight end 18 is substantially extended out of the body 22.

The fishing lure 10 further includes an actuating mechanism located at least partially within the body 22 between the fishing line 12 and the hook 14. The actuating mechanism allows pivoting of the hook 14 towards the extended configuration shown in FIG. 1 upon tension being applied to the fishing line 12.

The fishing lure 10 still further includes a biasing means for generating a biasing force. The biasing force, series connected to the actuating mechanism, is intended to bias the hook 14 towards the retracted configuration shown in FIG. 5. Furthermore, the fishing lure 10 also includes an adjustment means to allow for adjustment of the strength of the biasing force generated by the biasing means.

Figure 2:
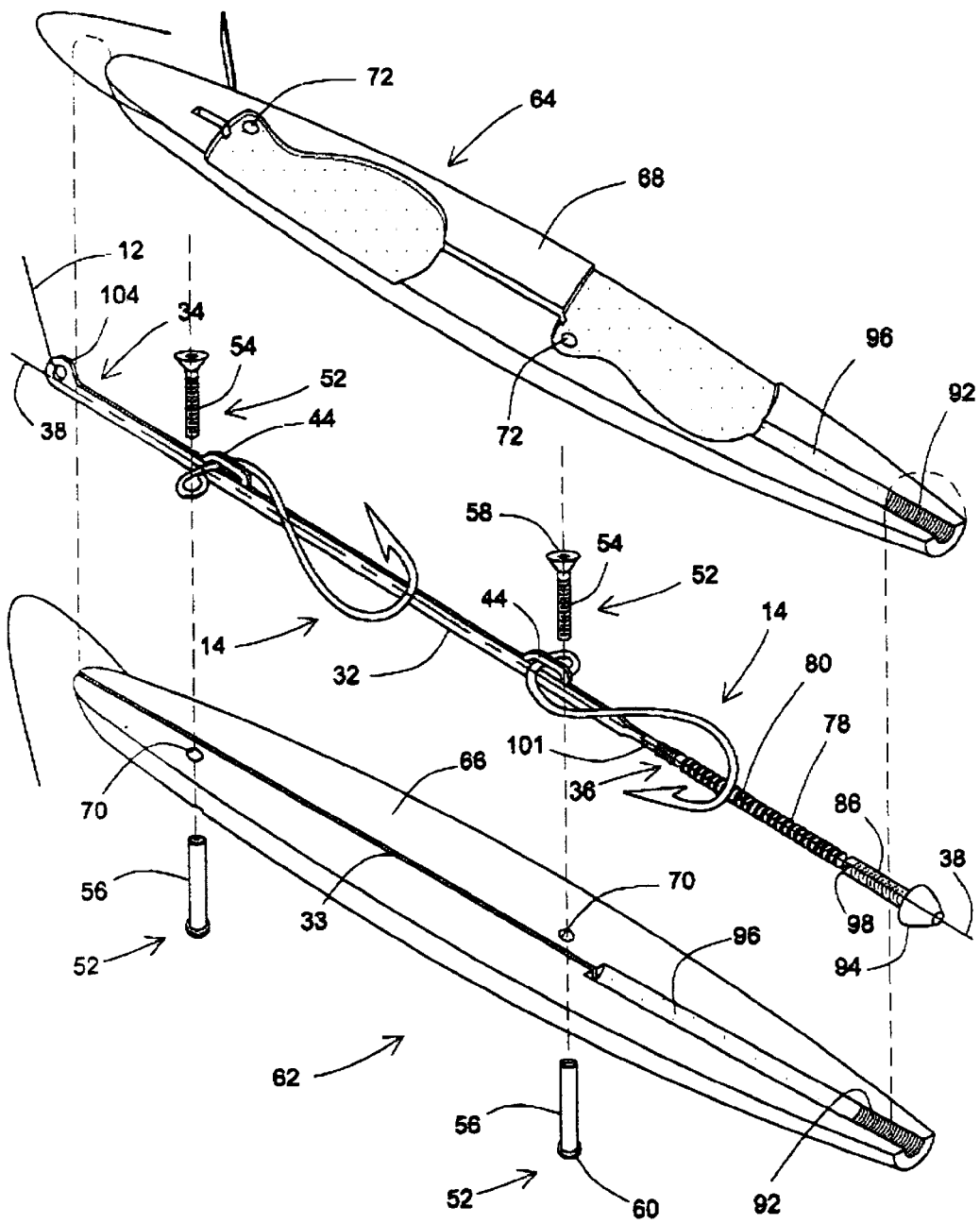
FIG. 2, in an exploded view, illustrates some of the components of the fishing lure shown in FIG. 1.

As illustrated more specifically in FIGS. 2, and 5, the actuating mechanism typically includes an elongated actuating rod 32 defining a rod first end 34, a rod second end 36 and a rod longitudinal axis 38. The actuating rod 32 is slidably inserted in a corresponding rod channel 33 formed in the body 22. The rod channel 33 allows reciprocating movement of the actuating rod 32 along its rod longitudinal axis 38 between a rod first position illustrated In phantom lines in FIG. 6 and a rod second position illustrated in full lines in FIG. 6.

The actuating mechanism also includes a rod-to-hook linking means for linking the actuating rod 32 to the hook 14 and for converting the translational reciprocating movement of the rod 32 into a pivoting movement of the hook 14. The rod-to-hook linking means converts the movement of the rod 32 towards the rod first position into a pivotal movement of the hook 14 towards the extended configuration as shown in phantom lines in FIG. 6. The rod-to-hook linking means also converts the translational movement of the actuating rod 32 towards the rod second position into a pivotal movement of the hook 14 towards the retracted configuration shown in full lines in FIG. 6.

Figure 7:
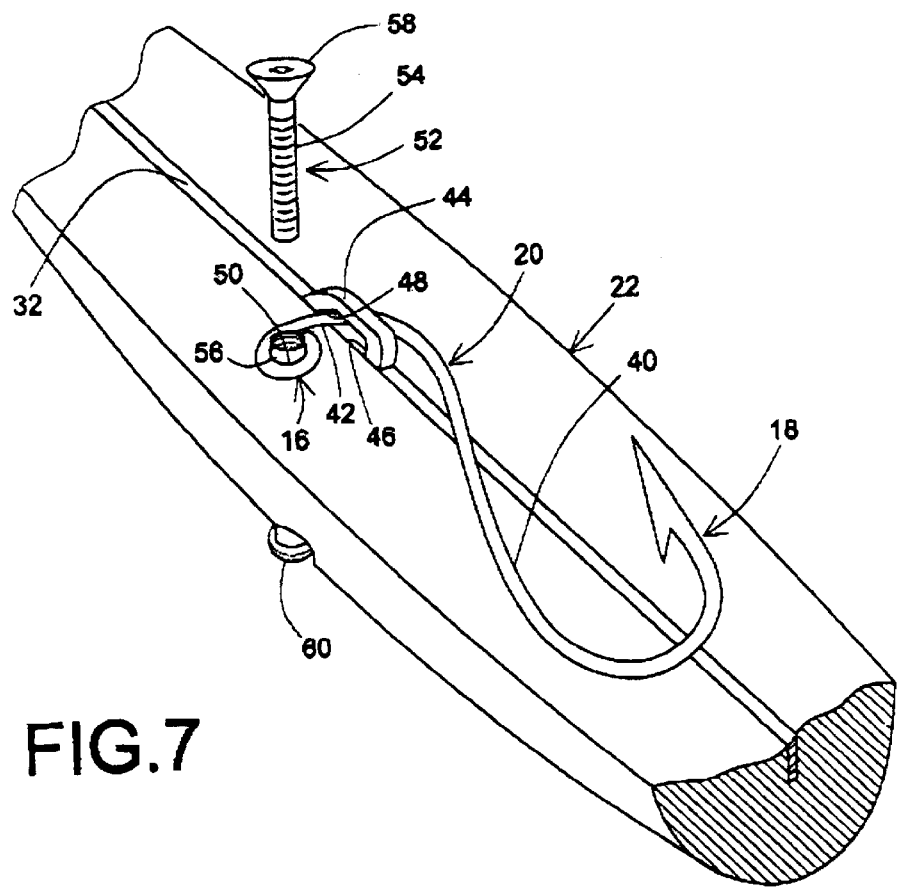
FIG. 7, in a perspective view, illustrates the connection between a fish hook and an actuating rod part of a fishing lure in accordance with an embodiment of the present invention.

As illustrated more specifically in FIG. 7, each hook shank 20 typically has a generally L-shaped configuration defining a shank spacing leg 40 bending integrally into a generally perpendicular shank abutment leg 42. Typically, the rod-to-hook linking means includes a rod eyelet 44 extending from the rod 32 in a generally radial or perpendicular relationship relative to the rod longitudinal axis 38.

Typically, the shank abutment leg 42 is inserted into a corresponding rod eyelet 44 for abutment therewith. More specifically, as illustrated in greater details in FIG. 7, each rod eyelet 44 defines a first rod eyelet abutting surface 46 and a second rod eyelet abutting surface 48 for respectively abutting against the shank abutment leg 42 when the actuating rod 32 is moved between the rod first and second positions.

Typically, the hook attachment end 16 is provided with a hook eyelet 50 extending integrally from the shank abutment leg 42. Typically, as illustrated in FIG. 7, the hook pivotal attachment means includes a hook attachment pin 52 extending through the hook eyelet 50 and attached to the body 22.

As shown more specifically in FIG. 7, each hook attachment pin 52 typically includes both a pin-screw component 54 and a pin-sleeve component 56. The pin-screw component 54, in turn, includes a threaded stem and a screw head 58 while the pin-sleeve component 56 includes an internally threaded sleeve channel and a sleeve head 60. The pin-screw stem is adapted to be threadably inserted into the sleeve channel for protecting the hook eyelet 50 against potential wear or damage by the external threads formed on the threaded stem of the pin-screw component 54, and vice-versa.

As illustrated more specifically in FIGS. 2 through 5, the body 22 is preferably made out of two half-body sections, mainly a first half-body section 62 and a second half-body section 64. The first half-body section 62 and the second half-body section 64 are respectively provided with first and second half-body contacting surfaces 66, 68. The first and second half-body contacting surfaces 66, 68 are in a mating and contacting configuration relative to each other when the body 22 is in the assembled configuration shown in FIG. 1.

The hook attachment pin 52 is preferably used for maintaining the first and second half-body sections 62, 64 in their assembled configuration shown in FIG. 1. A first and a second half-body assembly aperture 70, 72 respectively extend through the first and second halt-body sections 62, 64. The first and second half-body assembly apertures 70, 72 are positioned so as to be grouped in pairs and in register with each other when the first and second half-body sections 62, 64 are in their assembled configuration.

The pin-screw component 54 and the pin-sleeve component 56 are typically inserted through the first and second half-body assembly apertures 70, 72 and tightened to each other using a screwdriver or other suitable tool so as to maintain the first and second half-body sections 82, 64 pressured against each other.

The first and second half-body assembly apertures 70, 72 are preferably provided with corresponding chamfered sections for substantially fittingly receiving corresponding pin-screw component and pin-sleeve component heads 58, 60 so that the latter are prevented from protruding outwardly from the outer surface of the first and second half-body sections 62, 64. The hook attachment pins 52 are thus used preferably both for attaching a corresponding hook 14 to the body 22 and for maintaining the half-body sections 82, 64 in the assembled configuration.

Figure 6:
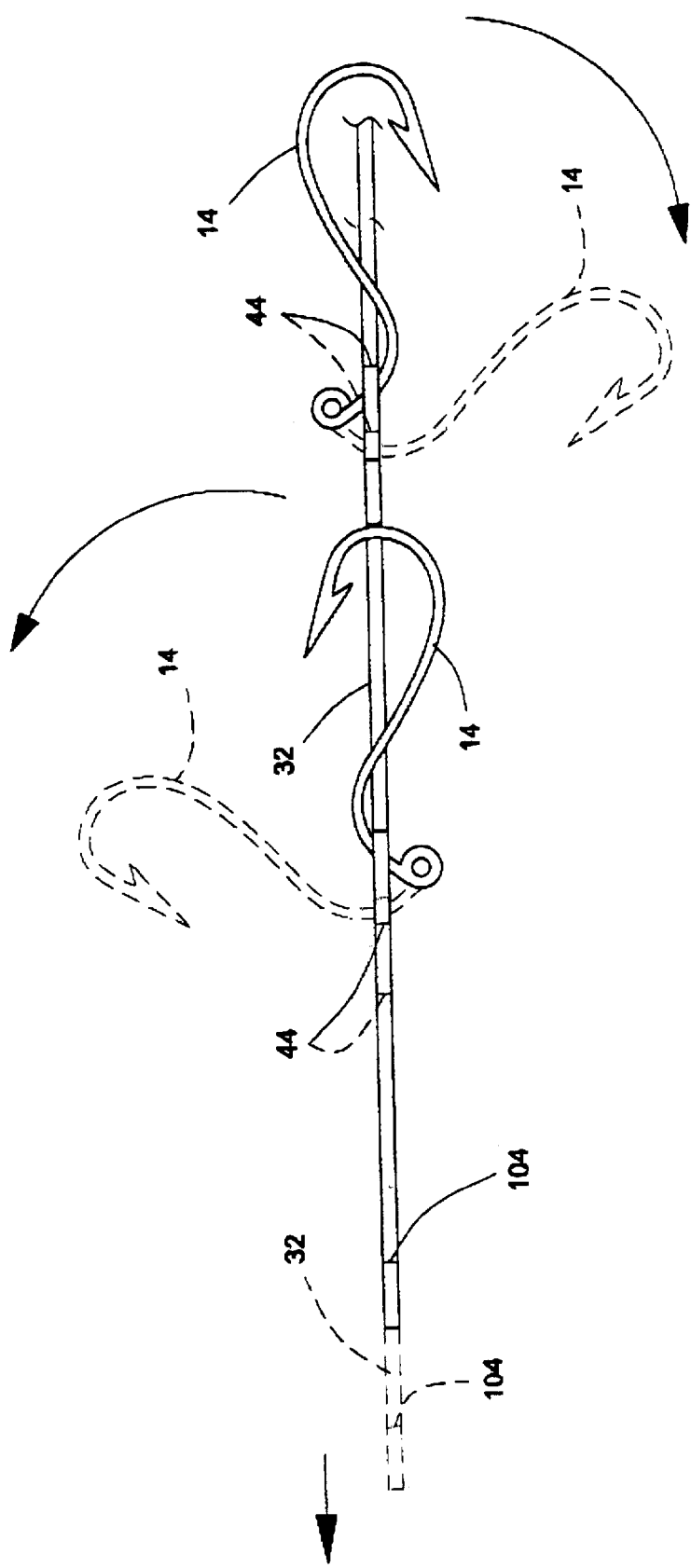
FIG. 6, in a top view, illustrates a fish hook linked to an actuating rod, the fish hook being shown in a retracted configuration and pivoted to an extended configuration, in full and phantom lines, respectively.

As illustrated more specifically in FIGS. 2, and 6, each rod eyelet 44 is preferably configured and sized for allowing slidable insertion of a corresponding hook eyelet 50 thereinto. Each rod eyelet 44 is thus preferably given a generally oval-shaped configuration so as to facilitate slidable insertion of a corresponding hook eyelet 50 thereinto. The capacity of the rod eyelets 44 to allow slidable insertion of a corresponding hook eyelet 50 combined with the use of easily assembled half-body sections 62, 64 facilitates the replacement of the hooks 14 in the event that the latter may become damaged or in the event that an intended user wishes to use different types of the hooks for different fishing conditions.

As illustrated more specifically in FIGS. 2 through 5, the half-body assembly apertures 70, 72 may be positioned on either side of the actuating rod 32. Positioning of the half-body assembly apertures 70, 72 on both sides of the actuating rod 32 allows corresponding hooks 14 to be deployed on opposite lateral sides of the body 22 when the actuating rod 32 is moved to the actuating rod first position. Alternatively, the first and second half-body assembly apertures 70, 72 could be positioned on the same side of the actuating rod 32 so that the corresponding hooks 14 would be deployed through corresponding hook recesses 30 located on a common lateral side of the body 22.

In order to facilitate assembly of the first and second half-body sections 62, 64 in their assembled configuration the first and second half-body sections 62, 64 may optionally be provided with half body alignment means. In the preferred embodiment of the invention, the half-body alignment means includes alignment tongues 74 extending from either the first or second half-body contacting surface 66 or 68 and corresponding alignment slots 76 complimentarily formed in either the first or second half-body contacting surfaces 66, 68. The alignment tongues 74 and slots 76 are positioned so as to be in register with each other and so that the alignment tongues 74 may be inserted into corresponding alignment slots 76 when the first and second half-body sections 62, 64 are in their assembled configuration.

Typically, the biasing means includes a spring component 78 attached both to the actuating rod 32 adjacent the rod second end 36 and to the body 22. As illustrated more specifically in FIGS. 2, and 5, the spring component is preferably an helicoidal-type spring 78 defining a spring longitudinal axis 80. The spring longitudinal axis 80 is typically in a substantially collinear relationship relative to the rod longitudinal axis 38. The spring component 78 also defines a spring first end 82 and an opposed spring second end 84.

The biasing means typically also includes a tensioning shaft 86. The tensioning shaft 86 defines a shaft first end 88 and an opposed shaft second end 90. The shaft first end 88 is attached to the spring second end 84 and the shaft second end 90 preferably protrudes outwardly from the body 22 adjacent the body second longitudinal end 28. The adjustment means includes a shaft positioning means for axially positioning the tensioning shaft 86 relative to the body 22.

Preferably, the body 22 is provided with a tensioning shaft recess 92 for receiving the tensioning shaft 86. Also, preferably, the shaft positioning means includes shaft external threads extending outwardly from the tensioning shaft 86 and corresponding recess threads formed in the shaft recess 92. The shaft threads and recess threads cooperate for positioning the tensioning shaft 86 relative to the body 22.

As mentioned previously, the shaft second end 90 typically protrudes outwardly from the body 22. The section of the shaft second end 90 protruding from the body 22 is typically provided with a means for allowing an intended user to rotate the tensioning shaft 86 about its longitudinal axis so as to allow the shaft threads and recess threads to cooperate in positioning the tensioning shaft 86 relative to the body 22. Preferably, a knob 94 extends from the tensioning shaft 86 and is readily accessible by the fingers of an intended user to manually rotate the tensioning shaft 86. Alternatively, a screw head or other means for rotating the tensioning shaft 86 could be provided.

Typically, the body 22 is further provided with a spring recess 96 for receiving the helicoidal-type spring 78 as illustrated in FIG. 2. When the body 22 is made of two half-body sections 62, 64, the rod channel 33, the shaft recess 92 and the spring recess 96 are correspondingly formed of half-sections formed in the first and second half-body sections 62, 64.

The spring second longitudinal end 84 is preferably attached to the tensioning shaft first longitudinal end 88 through the use of a spring loop 96 anchored in a corresponding shaft aperture 98 formed in the tensioning shaft 86 adjacent the shaft first longitudinal end 88.

The spring first longitudinal end 82 is preferably attached to the actuating rod 32 adjacent the actuating rod second longitudinal end 36 by a spring-to-rod attachment means allowing transmission of axial forces between the spring component 78 and the actuating rod 32 with reduced transmission of rotational torque about the rod and spring longitudinal axes 38, 80 between the spring component 78 and the actuating rod 32. In other words, the spring-to-rod attachment means is intended to allow transmission to the actuating rod 32 of the biasing force generated by the spring component 78 without transmitting to the actuating rod 32 the tension-creating rotational torque created by the rotation of the tensioning shaft 86 and hence of the spring component 78.

Typically, the spring-to-rod attachment means includes a narrowed spring attachment section 101 formed on the actuating rod 32 adjacent the rod second end 36. The spring attachment section 101 is configured and sized for slidable insertion of a segment of the spring component 78 thereover as illustrated in FIG. 5. The spring-to-rod attachment means also includes a retaining protrusion formed on the spring attachment section 101 for abuttingly retaining a segment of the spring component 78 over the spring attachment section 101. The retaining protrusion preferably has a generally spherical configuration so as to reduce the risk of transmitting rotational torque between the spring component 78 and the spring attachment section 101.

Figure 4B:
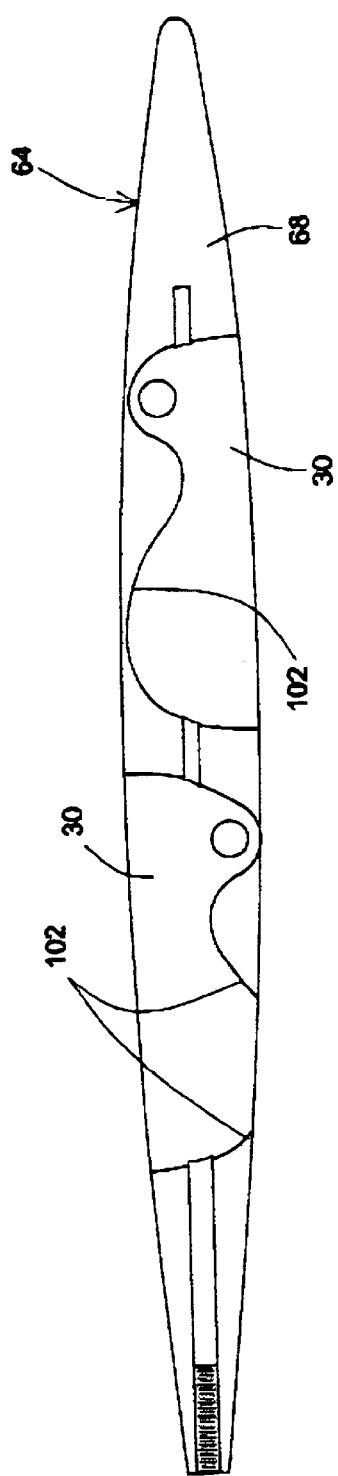

Referring now more specifically to FIGS. 4a and 4b, there is shown that the hook recesses 30 are preferably formed in the second half-body contacting surface 68 of the second half body section 64. Alternatively, the hook recesses 30 could be formed in both the first and second half-body contacting surfaces 66, 68 or in the first half-body contacting surface 66.

Each hook recess 38 defines a corresponding hook recess abutment wall 102 having a configuration substantially similar to the configuration of a corresponding hook shank 20. Each hook recess abutment wall 102 is intended to act as a pivotal range limiting means for abuttingly limiting the pivotal movement of a corresponding hook 14 towards the hook retracted configuration. In other words, pivotal movement of a hook 14 towards its retracted configuration as a result of the biasing force generated by the spring component 78 is limited by the abutting contact of the hook shank 20 against the corresponding hook recess abutment wall 102.

As illustrated more specifically in the right hand side of FIG. 4b, the hook abutment wall 102 may extend uninterrupted within the body 22 or, alternatively, as illustrated in the left hand side of FIG. 4b, the hook recess abutment wall 102 may be interrupted and located so that a portion of the hook shank 20 extends outwardly from the body 22 even when the hook 14 is in its fully retracted configuration. Hence, as illustrated in FIG. 5, when the hook recess abutment wall 102 contacts the hook shank 20 throughout its entire length, the hook 14 is fully inserted within the body 22 when in its fully retracted configuration whereas as illustrated in the left hand side of FIG. 5 when the hook recess abutment wall 102 is interrupted by the peripheral wall of the body 22 a section of the hook shank 20 extends outwardly from the body 22 when the hook 14 is in its fully retracted configuration.

The fishing line 12 is typically attached to the actuating rod 32 adjacent the actuating rod first longitudinal end 34 through the use of an actuating rod eyelet 104 extending typically integrally from the actuating rod first longitudinal end 34. The actuating rod eyelet 104 is typically positioned so as to extend outwardly from the body 22 as illustrated in FIG. 1.

Figure 8:
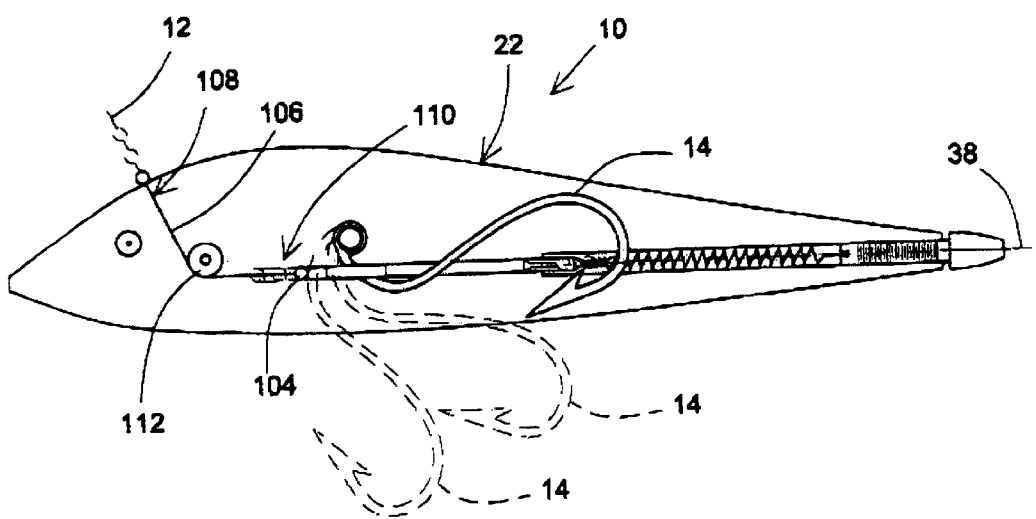
FIG. 8, in a partial elevational view with sections taken out, illustrates a fishing lure in accordance with an alternative embodiment of the present invention.

In an alternative embodiment of the invention shown in FIG. 8, the fishing line 12 is attached to the lure cable 106 defining a lure cable first end 108 and an opposed lure cable second end 110. The fishing line 12 is attached to the lure cable first end 108 while the lure cable second end 110 is attached to the actuating rod eyelet 104 located within the body 22. The lure cable 106 is redirected by a lure cable pulley 112 located within the body 22. The lure cable pulley 112 is rotatably mounted within the body 22 so as to allow the lure cable 106 to be redirected with relatively low friction.

The lure cable pulley 112 and the lure cable 106 allow the fishing line 12 to be attached to the fishing lure 10 so as to extend in a direction other than the actuating rod longitudinal axis 38. This may prove to be desirable in certain fishing settings such as when other fishing accessories are attached to the fishing line 12.

As illustrated more specifically in FIG. 1, the fishing lure 10 is optionally provided with a conventional lip or pallet 114. The lip or pallet 114 is typically used for allowing the lure 10 to sink. As the lip 114 and the fishing line 12 may become entangled in vegetation or debris even when the hooks 14 are in the retracted configuration, the lure 10 is optionally provided with deflecting wires 116 extending therefrom. The deflecting wires 116 are preferably positioned adjacent the connection of the fishing line 12 with the body 22 and preferably extend over the lip 114 so as to deflect the debris away therefrom.

Deflecting wires 116 are preferably made out of a substantially resilient material, typically a resilient metallic alloy as to allow the deflecting wires 116 to resiliently spring back to their original configuration once they have deflected debris away from the fishing lure 10. Although FIG. 1 illustrates deflecting wires having a generally L-shaped configuration and grouped in a pair, it should be understood that the deflecting wires 116 could have other configurations and grouped in other types of formation without departing from the scope of the present invention.

In use, the fishing line 12 is attached to the actuating rod 32 either directly through the use of the actuating rod eyelet 104 or other suitable means or indirectly through the use of the lure cable 106. The biasing force exerted by the spring component 78 is then adjusted typically through the use of the adjustment knob 94. The adjustment knob 94 adjusts the relative positioning between the tensioning rod 86 and the body 22 hence increasing or decreasing the tension in the spring component 78. The tension with the spring component 78 is transmitted to the action rod 32.

The tension in the biasing spring 78 is adjusted depending on the fishing parameters. For example, if the fishing lure 10 is to be dragged in relatively thick vegetation, the biasing force in the biasing spring 78 is increased so that-the drag forces exerted on the fishing lure 10 and, hence, the tension in the fishing line 12 will not unwantingly deploy the hooks 14 in their extended configuration. Conversely, in situations wherein the risks of having the hooks 14 snagged in vegetations or other debris are reduced, the tension in the biasing spring 78 is reduced so that the hooks 14 will readily deploy in their extended configuration upon a fish biting on the fishing lure 10.

When a fish bites on the fishing lure 10, the tension in the fishing line 12 is increased. The increased tension in the fishing line 12 eventually exceeds the resistance of the biasing force exerted by the biasing spring 78 and causes the actuating rod 32 to translate towards the actuating rod first position. Translational sliding movement of the action rod 32 within the body 22 eventually causes rod eyelet first abutment surface 46 to contact the shank abutting section 42 causing the hook 14 to pivot towards its extended configuration for snagging the fish. Conversely, when tension is reduced in the fishing line 12, the biasing force generated by the biasing spring component 78 causes the actuating rod 32 to translate back towards the actuating rod second position. The transitional movement of the actuating rod 32 eventually causes the actuating rod eyelet second abutment surface 48 to contact the shank abutment section 42 hence pivoting the hook 14 towards its retracted configuration.

Although the present fishing lure has been described with a certain degree of particularity, it is to be understood that the disclosure has been made by way of example only and that the present invention is not limited to the features of the embodiments described and illustrated herein, but includes all variations and modifications within the scope and spirit of the invention as hereinafter claimed.

What is claimed is:

1. A fishing lure for attachment to a fishing line, said fishing line allowing selective deployment of a hook, said hook defining a hook attachment end, a hook bight end and a hook shank extending therebetween; said fishing lure comprising:

a body, said body being provided with a hook recess projecting thereinto for receiving said hook;

a hook pivotal attachment means attached to said body for pivotally attaching said hook to said body so as to allow said hook to pivot between a retracted configuration wherein said hook bight end is substantially housed within said hook recess and an extended configuration wherein said hook bight end is substantially extended out of said hook recess;

an actuating mechanism located at least partially within said body between said fishing line and said hook for pivoting said hook towards said extended configuration upon a tension being applied to said fishing line, said actuating mechanism including an elongated actuating rod connected to said hook, said actuating rod defining a rod first end, a rod second end and a rod longitudinal axis, said actuating rod being slidably inserted in a corresponding rod channel formed in said body for longitudinal reciprocating movement thereinto between a rod first position with said hook in said extended configuration and a rod second position with said hook in said retracted configuration;

a biasing means for generating a biasing force, said biasing force biasing said actuating rod towards said rod second position and said hook towards said retracted configuration;

an adjustment means for adjusting the strength of said biasing force, said adjusting means including a tensioning shaft in a substantially collinear relationship relative to said rod longitudinal axis, said tensioning shaft being slidably inserted in a corresponding shaft recess formed in said body, said tensioning shaft defining a shaft first end and a shaft second end, said biasing means connecting to both said shaft first end and said actuating rod adjacent said rod second end, said shaft second end protruding outwardly from said body, said adjustment means further including a shaft positioning means for selectively axially positioning said tensioning shaft relative to said body.

2. A fishing lure as recited in claim 1 wherein said actuating mechanism includes:

a rod-to-hook linking means for linking said actuating rod to said hook and converting the linear reciprocating movement of said actuating rod into a pivoting movement of said hook such that linear movement of said actuating rod towards said rod first position is converted into a pivotal movement of said hook towards said extended configuration and linear movement of said actuating rod towards said rod second position is converted into pivotal movement of said hook towards said hook retracted configuration.

3. A fishing lure as recited in claim 2 wherein said hook has a generally L-shaped configuration defining a shank spacing leg and a generally perpendicular shank abutment leg;

said rod-to-hook linking means including a rod eyelet extending from said actuating rod in a direction generally perpendicular to the rod longitudinal axis, said shank abutment leg being inserted in said rod eyelet.

4. A fishing lure as recited in claim 3 wherein said hook attachment end is provided with a hook eyelet and wherein said hook pivotal attachment means includes a hook attachment pin attached to said body and extending through said hook eyelet.

5. A fishing lure as recited in claim 4 wherein said rod eyelet is configured and sized for allowing slidable insertion of said hook eyelet is said rod eyelet.

6. A fishing lure as recited in claim 4 wherein said body is made of two half-body sections, said hook attachment pin being also used for securing said half-body sections together.

7. A fishing lure as recited in claim 2 wherein said biasing means includes a spring component attached to both said shaft first end and said actuating rod adjacent said rod second end.

8. A fishing lure as recited in claim 7 wherein said spring component is an helicoloidal-type spring defining a spring longitudinal axis, a spring first end and a spring second end, said spring longitudinal axis being in a substantially collinear relationship relative to said rod longitudinal axis.

9. A fishing lure as recited in claim 8 wherein said shaft positioning means includes a shaft thread formed on said tensioning shaft and a recess thread formed in said shaft recess, said shaft thread and said recess thread cooperating for positioning said tensioning shaft relative to said body.

10. A fishing lure as recited in claim 8 wherein said spring second end is attached to said shaft first end and said spring first end is attached to said rod second end by a spring-to-rod attachment means, said spring-to-rod attachment means allowing transmission of axial forces between said spring component and said actuating rod without transmitting rotational torque about said rod longitudinal axis between said spring component and said actuating rod.

11. A fishing lure as recited in claim 10 wherein said spring-to-rod attachment means includes:

a spring attachment section formed on said actuating rod adjacent said rod second end, said spring attachment section being configured and sized for slidable insertion of a segment of said spring component thereover;

a retaining protrusion formed on said spring attachment section for abuttingly retaining a segment of said spring component over said spring attachment section.

12. A fishing lure as recited in claim 11 wherein said retaining protrusion has a generally spherical configuration.

13. A fishing lure as recited in claim 8 wherein said body is made of a first half-body section and a second half-body section, said first and second half-body sections respectively defining first and second half-body contacting surfaces;

said first half-body contacting surface being provided with said rod channel formed therein and said shaft recess formed therein;

said second half-body contacting surface being provided with said hook recess formed therein.

14. A fishing lure as recited in claim 13 wherein said first and second half-body contacting surfaces are provided with corresponding tongue-and groove arrangements extending therefrom for facilitating assembly of said first and second half-body sections together.

15. A fishing lure as recited in claim 1 further comprising a pulley mounted within said body and a cable attached between said rod first end and said fishing line, said cable being redirected by said pulley so as to allow said fishing line to be redirected relative to said body.

16. A fishing lure for attachment to a fishing line, said fishing lure comprising:

a body, said body defining a hook recess projecting thereinto;

a hook for connecting to said fishing line to allow for selective deployment thereof, said hook defining a hook attachment end, a hook bight end and a hook shank extending therebetween;

a hook pivotal attachment means attached to said body for pivotally attaching said hook to said body so as to allow said hook to pivot between a retracted configuration wherein said hook bight end is substantially housed within said hook recess and an extended configuration wherein said hook bight end is substantially extended out of said hook recess;

an actuating mechanism located at least partially within said body between said fishing line and said hook for pivoting said hook towards said extended configuration upon a tension being applied to said fishing line, said actuating mechanism including an elongated actuating rod connected to said hook, said actuating rod defining a rod first end, a rod second end and a rod longitudinal axis, said actuating rod being slidably inserted in a corresponding rod channel formed in said body for longitudinal reciprocation movement thereinto between a rod first position with said hook in said extended configuration and a rod second position with said hook in said retracted configuration;

a biasing means for generating a biasing force, said biasing force biasing said actuating rod towards said rod second position and said hook towards said retracted configuration;

an adjustment means for adjusting the strength of said biasing force, said adjustment means including a tensioning shaft in a substantially collinear relationship relative to said rod longitudinal axis, said tensioning shaft being slidably inserted in a corresponding shaft recess formed in said body, said tensioning shaft defining a shaft first end and a shaft second end, said biasing means connecting to both said shaft first end and said actuating rod adjacent said rod second end, said shaft second end protruding outwardly from said body, said adjustment means further including a shaft positioning means for selectively axially positioning said tensioning shaft relative to said body.

17. A fishing lure as recited in claim 16 wherein said actuating mechanism includes:

a rod-to-hook linking means for linking said actuating rod to said hook and converting the linear reciprocating movement of said actuating rod into a pivoting movement of said hook such that linear movement of said actuating rod towards said rod first position is converted into a pivotal movement of said hook towards said extended configuration and linear movement of said actuating rod towards said rod second position is converted into pivotal movement of said hook towards said hook retracted configuration.

18. A fishing lure as recited in claim 17 wherein said biasing means includes a spring component attached to both said shaft first end and said actuating rod adjacent said rod second end.

19. A fishing lure as recited in claim 18 wherein said spring component is an helicoloidal-type spring defining a spring longitudinal axis, a spring first end and a spring second end, said spring longitudinal axis being in a substantially collinear relationship relative to said rod longitudinal axis, said spring first end being attached to said rod second end, said spring second end being attached to said shaft first end of said adjustment means.

* * * * *